(12) United States Patent
Wilson et al.

(10) Patent No.: US 6,594,907 B2
(45) Date of Patent: Jul. 22, 2003

(54) CUTTING HEAD FOR A STRING TRIMMER

(75) Inventors: Michael Wilson, Crook (GB); Martin Riley, Newcastle Upon Tyne (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/945,103

(22) Filed: Aug. 31, 2001

(65) Prior Publication Data

US 2002/0035788 A1 Mar. 28, 2002

(30) Foreign Application Priority Data

Sep. 5, 2000 (GB) .............................................. 0021791
Nov. 29, 2000 (GB) .............................................. 0029079

(51) Int. Cl.[7] .......................................... A01D 34/416
(52) U.S. Cl. .............................. 30/276; 30/347; 56/12.7
(58) Field of Search .................... 30/276, 347; 56/12.7, 56/295

(56) References Cited

U.S. PATENT DOCUMENTS

| 4,189,833 A | * | 2/1980 | Kwater ........................ 30/276 |
|---|---|---|---|
| 4,259,782 A | * | 4/1981 | Proulx ......................... 30/276 |
| 4,866,846 A | * | 9/1989 | Hoffmann et al. ............ 30/276 |
| 4,989,321 A | | 2/1991 | Hoffmann ..................... 30/276 |
| 5,109,607 A | * | 5/1992 | Everts .......................... 30/276 |
| 5,136,782 A | * | 8/1992 | Calcinai ....................... 30/276 |
| 5,522,141 A | | 6/1996 | Sugihara et al. .............. 30/276 |
| 5,855,068 A | * | 1/1999 | Zilly et al. .................... 30/276 |
| 5,881,464 A | * | 3/1999 | Collings et al. .............. 30/276 |

FOREIGN PATENT DOCUMENTS

| EP | 0 417 966 A1 | 3/1991 |
|---|---|---|
| JP | 3053807 | 3/1991 |

* cited by examiner

Primary Examiner—Hwei-Siu Payer
(74) Attorney, Agent, or Firm—Harness, Dickey & Pierce, P.L.C.

(57) ABSTRACT

A string trimmer comprising an elongate shaft, a cutting head rotatably mounted on one end of the elongate shaft wherein the head comprises: a base; a cap; a spool rotatable mounted in the cap; an autofeed mechanism mounted within the cap and which interacts between the cap and the spool; wherein the cap is releasably attachable to the base. The cap clips into the base. The cap comprises a first part, and the base comprises a second part wherein two resilient deformable arms having ribs formed on the end of the arms are mounted on one part and which engage with corresponding holes formed in the other part.

28 Claims, 7 Drawing Sheets

US 6,594,907 B2

CUTTING HEAD FOR A STRING TRIMMER

TECHNICAL FIELD

The present invention relates to a string trimmer and in particular, a cutting head for a string trimmer.

BACKGROUND OF THE INVENTION

The problem with such designs is that it is difficult for the operator to change the cutting head when the existing spool is empty. The operator removes the cap from the base and then removes the old empty spool. The operator then has to insert a new spool into the base. However, this is a fiddly operation as the operator has to align the spool in a particular manner so as to engage the autofeed mechanism with the spool. Often the line tries to unravel itself during this operation—due to the resistance of line. Furthermore, the end of the cutting line has to be fed through an aperture formed in the base. Another problem is that the same autofeed mechanism is utilised for every new spool of line. Thus, it becomes worn due to constant usage and can get damaged each time the spool is replaced.

SUMMARY OF THE INVENTION

The present invention overcomes or at least reduces the effects of the above problems.

According to a first aspect of the present invention, there is provided a string trimmer comprising an elongate shaft, a cutting head rotatably mounted on one end of the elongate shaft wherein the cutting head comprises:

a base;

a cap;

a spool rotatable mounted in the cap;

an autofeed mechanism mounted within the cap and which interacts between the cap and the spool;

wherein the cap is releasably attachable to the base.

Such a construction enables the operator to simply disconnect the cap from the base and discard it. The operator then attaches a new cap which would include the spool and autofeed mechanism already assembled and ready to be used. A new autofeed system is therefore used for each new spool. All complicated assembly and necessary alignments are avoided which further avoids any possibility of damage to the autofeed mechanism.

The cap can also comprise at least one aperture through which, in use, an end of the cutting line extends from the spool. Eyelets can form the apertures.

By including the apertures on the cap, the need to feed the end of the cutting line through an exit hole on a cutting head is dispensed with thus yet further simplifying the task.

According to a second aspect of the present invention, there is provided a cutting head for a string trimmer comprising;

a base;

a cap;

a spool rotatable mounted in the cap;

wherein the cap is releasably attachable to the base.

According to a third aspect of the present invention, there is provided a cassette mechanism comprising:

a cap;

a spool rotatable mounted in the cap;

an autofeed mechanism mounted within the cap and which interacts between the cap and the spool;

wherein the cap is capable of releasably attaching to a base of a cutting head of a string trimmer.

BRIEF DESCRIPTION OF THE DRAWINGS

An embodiment of the present invention will now be described, with reference to the accompanying drawings, of which.

DETAILED DESCRIPTION OF THE PREFERRED EMBODIMENTS

Figure 1:
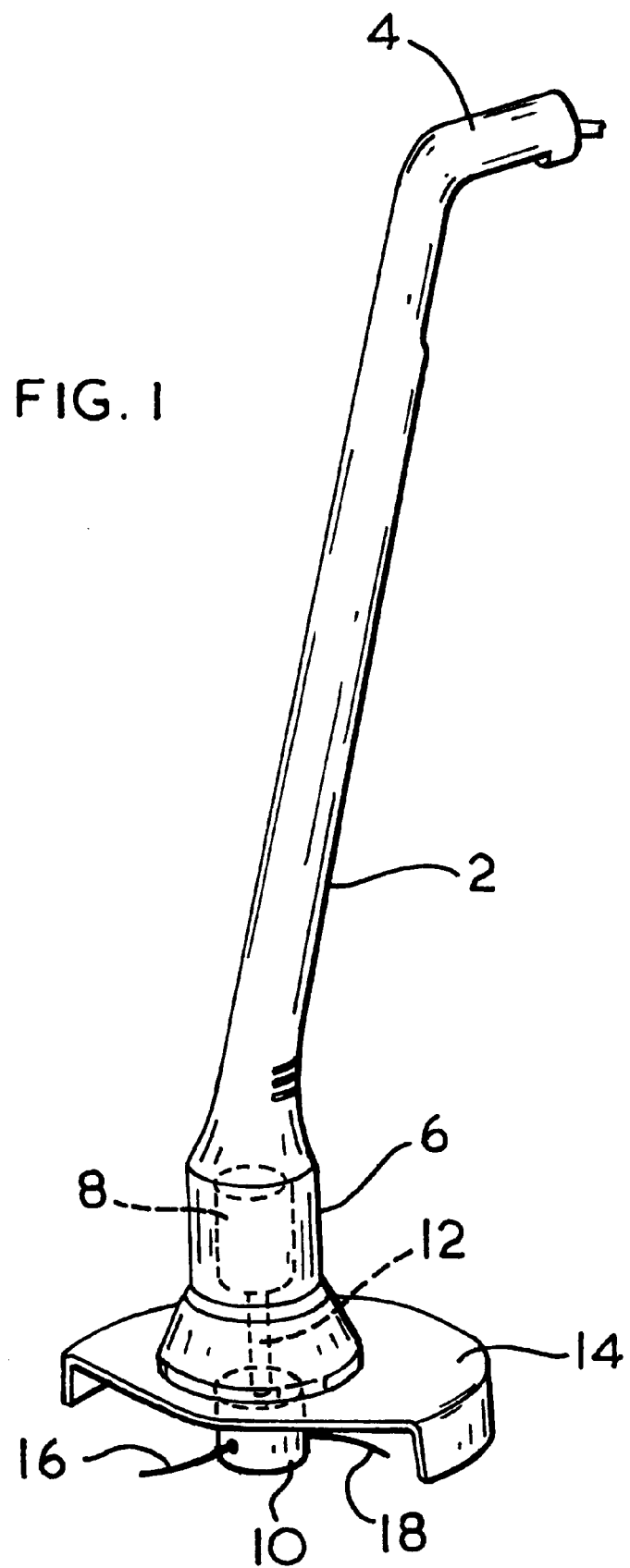
FIG. 1 shows a perspective view of a string trimmer.

FIG. 1 shows a string trimmer comprising an elongate shaft (2) having at one end a rear handle (4) and at the other end a motor housing (6). Mounted within the motor housing (6) is an electric motor (8) which rotatingly drives a cutting head (10) which is mounted on the spindle (12) of the electric motor (8). Connected to the base of the motor housing is a guard (14). Two cutting lines (16,18) extend from the side of the cutting head (10) in radially opposite directions. When the electric motor (8) is activated, the spindle (12) and hence cutting head (10) rotate causing the two cutting lines (16,18) to extend outwardly in a horizontal plane in radially opposite directions. The guard (14) surrounds the path swept out by the two cutting lines (16,18) as they rotate.

Figure 2:
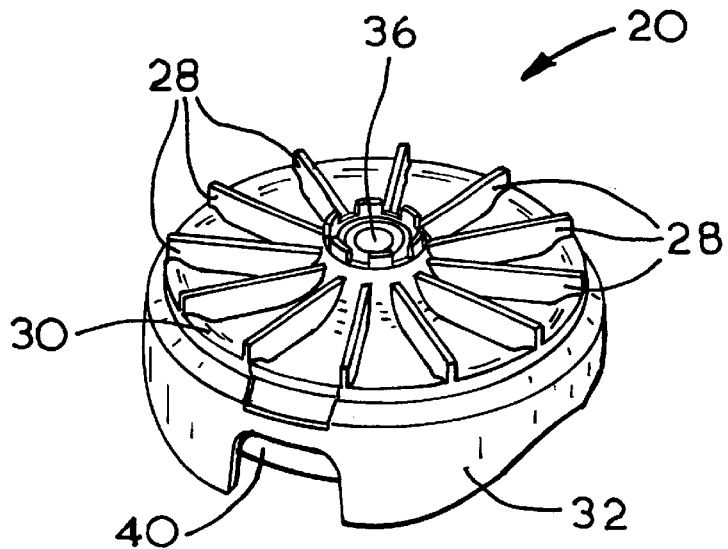
FIG. 2 shows a perspective view of the base of the cutting head.
Figure 3:
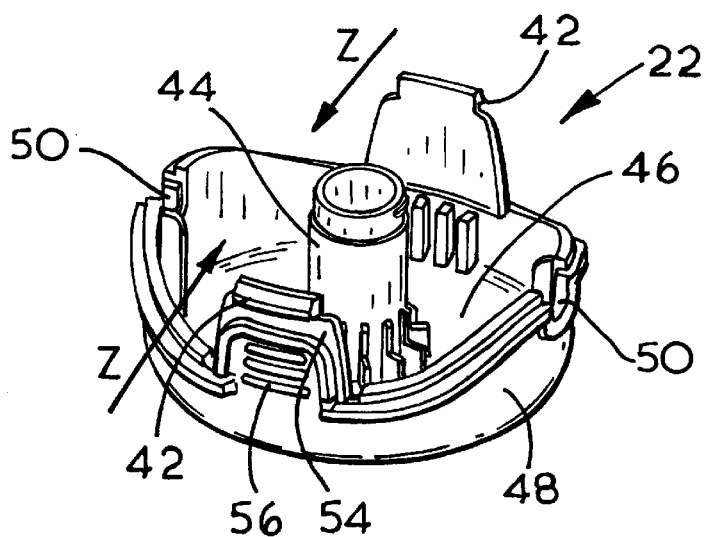
FIG. 3 shows a perspective view of the cap of the cutting head.
Figure 4:
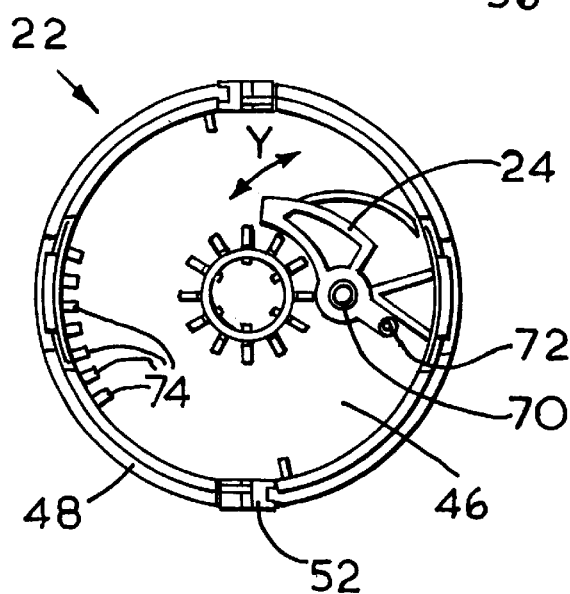
FIG. 4 shows a top view of the cap with the pivotal arm mounted in the cap.
Figure 5:
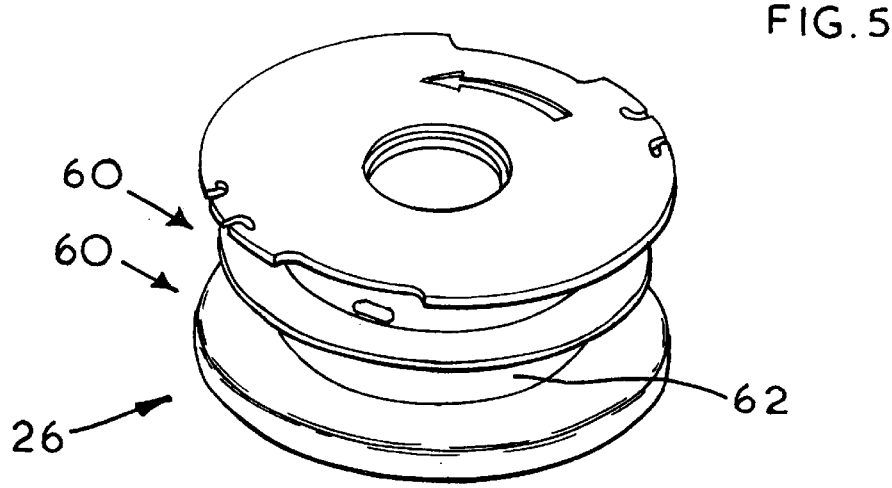
FIG. 5 shows a perspective view of the spool.

The cutting head (10) shall now be described in more detail. The cutting head (10) comprises the following component parts: a base (20) as best shown in FIG. 2; a cap (22) as best shown in FIG. 3; a pivotal arm (24) which is mounted inside the cap (22) as best shown in FIG. 4; and a spool (26) as best shown in FIG. 5 which is mounted within the cap (22) in engagement with the pivotal arm (24).

Figure 6:
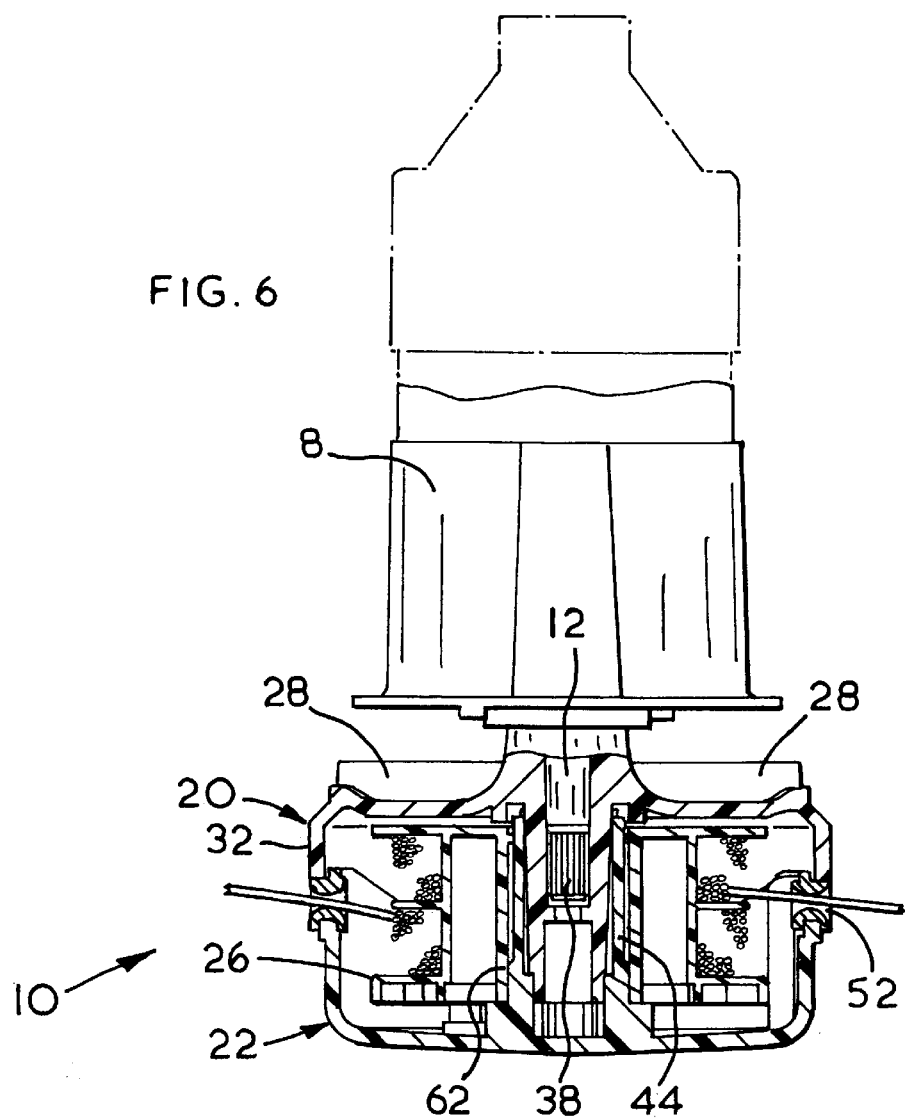
FIG. 6 shows a vertical cross-section of the cutting head mounted on the spindle of the motor.

The base (20) of the cutting head (10) is rigidly mounted onto the spindle (12) of the electric motor (8) as best shown in FIG. 6. The base comprises a plurality of fins (28) formed on the top of the base (20) as shown in FIG. 2.

Figure 7:
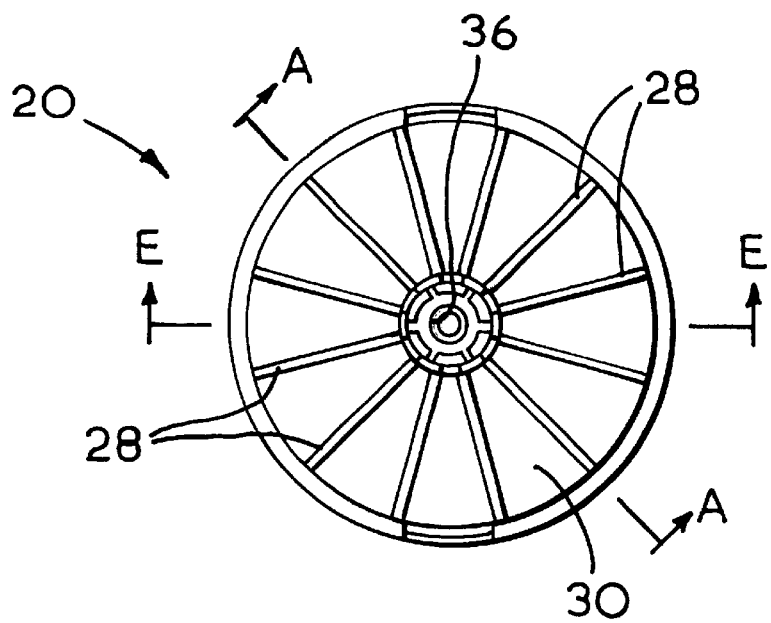
FIG. 7 shows a top view of the base of the cutting head.
Figure 8:
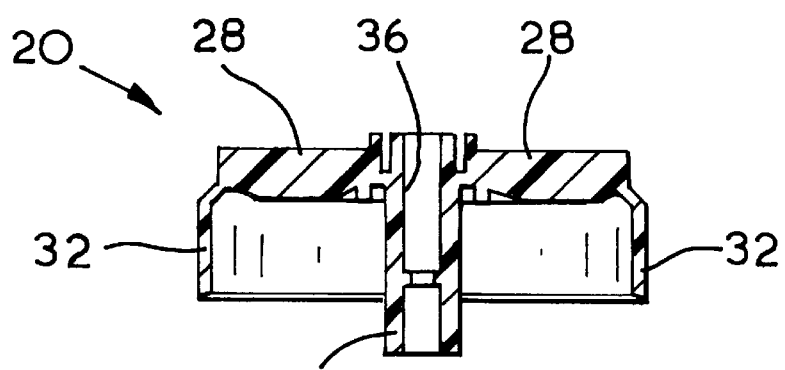
FIG. 8 shows a vertical cross-section of the base indicated by Arrow A in FIG. 7.
Figure 9:
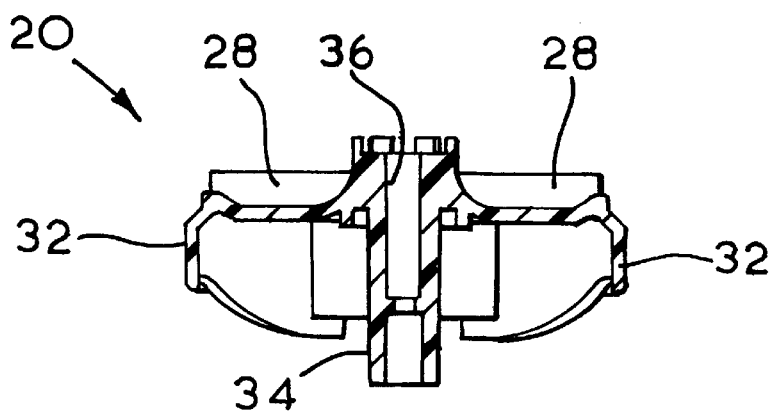
FIG. 9 shows a vertical cross-section of the base indicated by Arrow E in FIG. 7.
Figure 10:
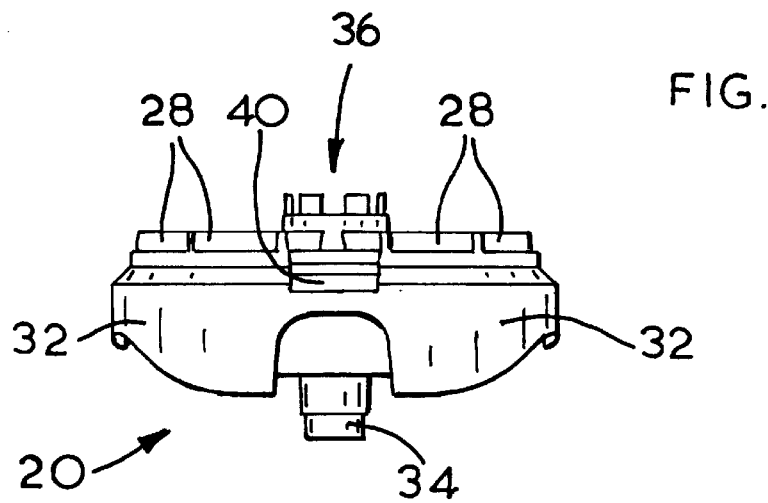
FIG. 10 shows a side view of the base.
Figure 11:
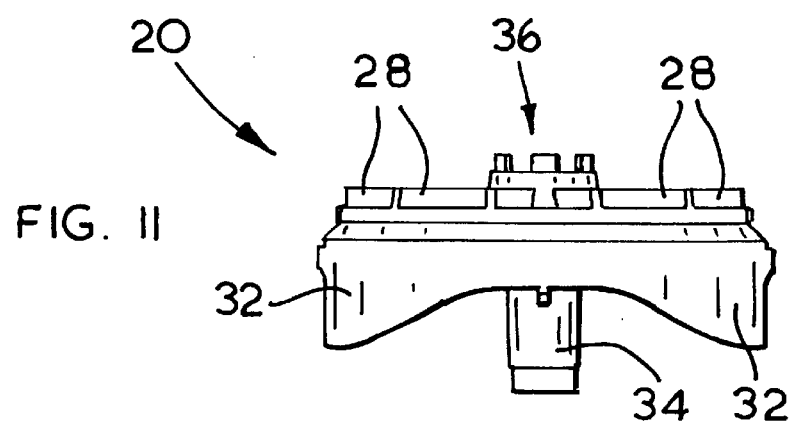
FIG. 11 shows a side view of the base 90° to that of FIG. 10.
Figure 12:
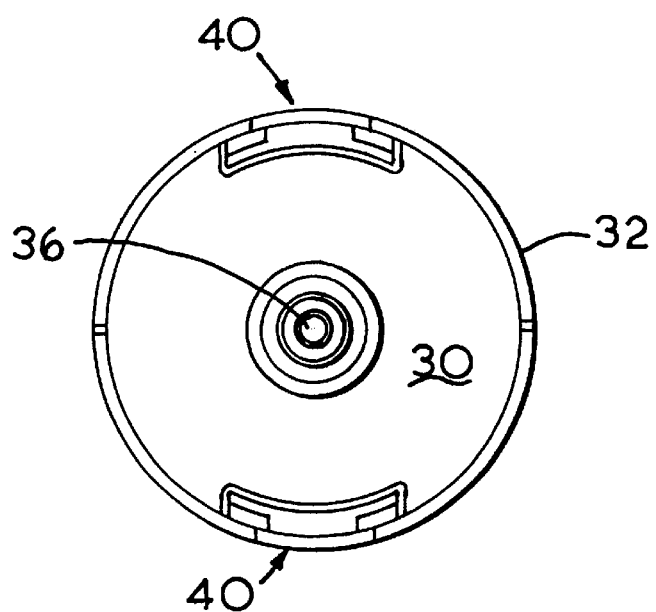
FIG. 12 shows a bottom view of the base.
Figure 13:
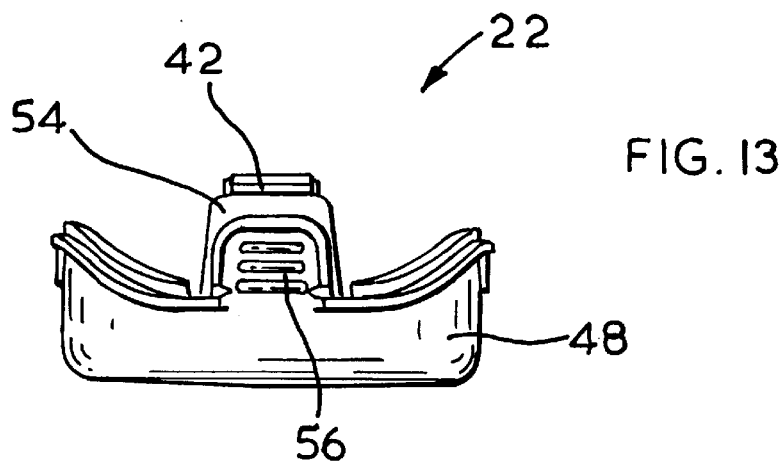
FIG. 13 shows a side view of the cap.
Figure 14:
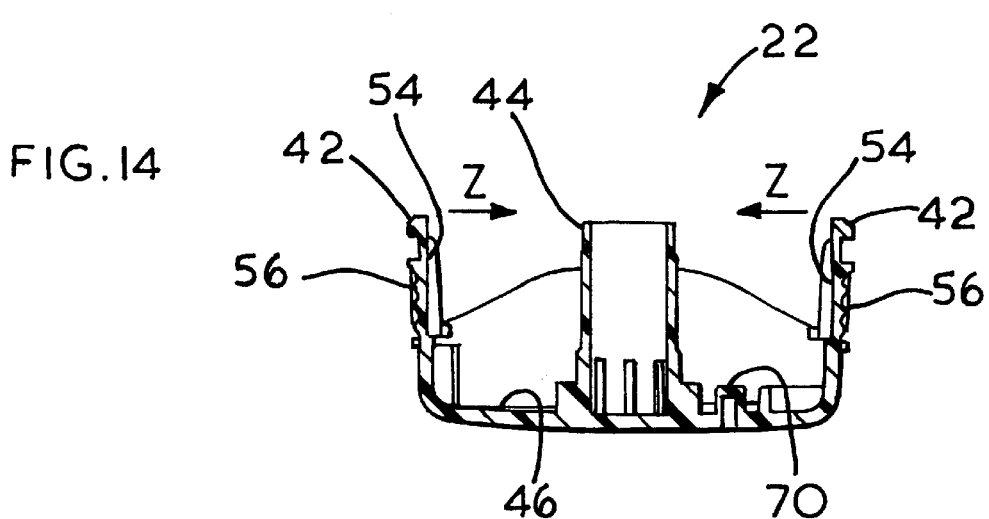
FIG. 14 shows a vertical cross-sectional view of the cap.
Figure 15:
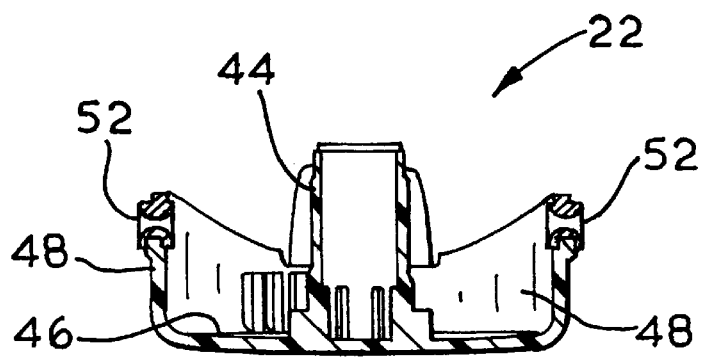
FIG. 15 shows a vertical cross-sectional view of the cap orientated 90° to FIG. 14.

FIG. 7 shows a view of a base (20) from above. FIG. 8 shows a vertical cross-section of the base through a section of the base indicated by the arrows A in FIG. 7. FIG. 9 shows a vertical cross-section of the base indicated by the arrows E in FIG. 7.

The base comprises a disc (30) around the periphery of which is formed a wall (32) which extends downwardly. The fins (28) are mounted on the opposite side of the disc to that of the wall (32). A central core (34) is formed in the middle of the disc (30) which extends downwardly parallel to the wall as best shown in FIG. 3. As can be seen in FIG. 6, the spindle (12) of the motor (8) extends into a bore (36) formed in the central core (34) of the base (20). Splines (38) extend along the length of the spindle (12) and which engage with the walls of the bore (36) of the core (34) of the base (20). Thus the base is rigidly attached to the spindle so that when the spindle rotates the base (20) similarly rotates. The fins (28) draw air downwardly through the motor housing past the motor (8) and expel it sidewards substantially perpendicular to the axis of rotation of the motor (8) in order to cool the motor (8).

Figure 16:
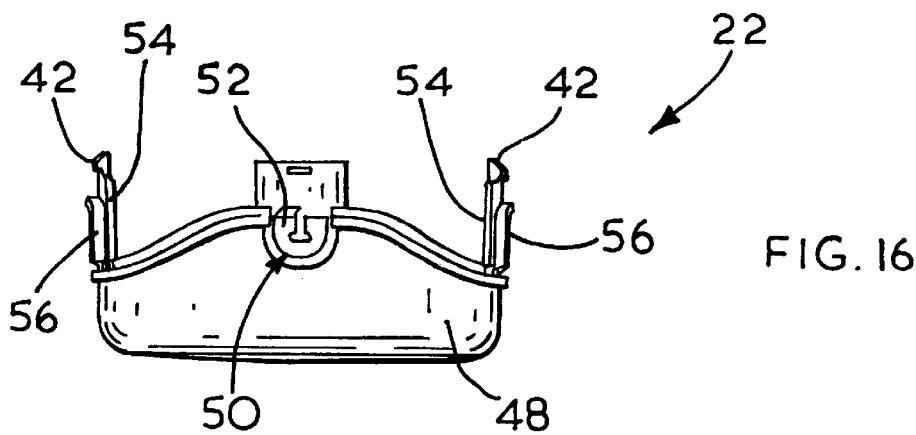
FIG. 16 shows a side view of the cap 90° to that of FIG. 15.

The cap (22) of the cutting head (10) is cup shaped having a central spindle (44) which projects from the base (46) of the cap (22) as best shown in FIG. 3. The spindle (44) is tubular. The height of the peripheral wall (48) of the cap (22) around the perimeter varies around the periphery. At two points (50) semicircular notches are formed in which eyelets (52) are inserted as best shown in FIG. 16. Located symmetrically between the eyelets (52) are two resilient clips (54) which project upwardly parallel to the spindle (44) as best shown in FIG. 3. The two clips (54) which are located opposite to each other are capable of being deformed inwardly as indicated by arrows Z. A rib (42) is formed at the end of each of the resilient clips (54). Part (56) of the clips (54) is formed as a finger pressure point. Two holes (40) are formed in the wall (32) of the base (20) which are capable of receiving the ribs (42) formed on the cap (22).

Figure 17:
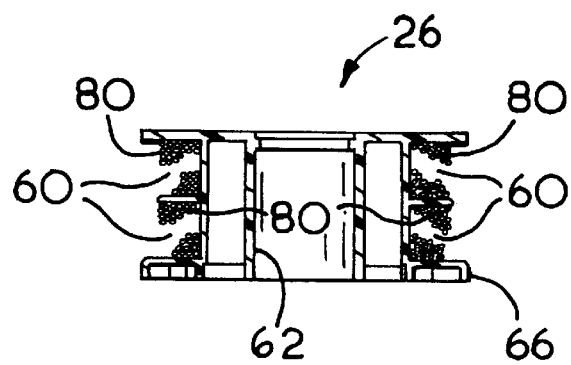
FIG. 17 shows a vertical cross-sectional view of the spool.
Figure 18:
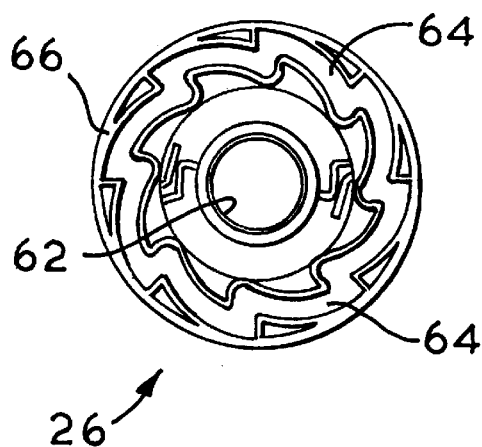
FIG. 18 shows the base of the spool.

The spool (26) as shown in FIG. 5 comprises two line retaining sections (60). FIG. 17 shows a vertical cross-section of the spool. The spool (26) has a central core (62). A wavy trough (64) is formed in the base (66) of the spool (26) as best shown in FIG. 18.

A pivotal arm (24) is mounted on the base (46) of the cap and is capable of pivoting around a small protrusion (70) which projects from the base (46) of the cap (22) as shown in FIG. 4. The pivotal arm (24) is capable of pivoting through an angular range of movements indicated by arrow Y in FIG. 4. On one end of the pivotal bar (24) is a peg (72) which projected upwardly from the pivotal bar (24) away from the base (46) of the cap (22). A plurality of plastic notches (74) are formed on the opposite side of the base (46) of the cap (22) to that of the pivotal bar (24) in order to counteract the additional weight of the pivotal bar (24) when the cutting head (10) rotates to ensure that the cutting head (10) remains stable.

When the spool (26) is mounted within the cap (22) the central core (62) is slid onto the central spindle (44) of the cap (22), the spool clipping onto the central spindle (44) thus preventing axial movement of the spool (26) along the longitudinal axis of the spindle (44). The peg (72) of the pivotal arm (24) locates within the trough (64) formed on the base (66) of the spool (26). The spool (26) is capable of freely rotating about the central spindle (44) of the cap (22), the rotational movement only being hindered by the interaction between the peg (72) on the pivotal arm (24) and the trough (64) formed on the underside of the spool (26). The pivotal arm (26) and the wavy trough (64) act as an autofeed mechanism allowing the line (80) stored on the spool (26) to be paid out when the cutting head is rotating during normal use when the line breaks.

The autofeed mechanism operates in the same manner as that disclosed in EP 0 417 966 and EP 0 417 967. The pivotal arm (24) has a centre of mass indicated by "C" in FIG. 4. As the cutting head (10) rotates, a biasing force in the direction X is exerted onto the pivotal arm (24) due to the centrifugal force which acts on the arm at the centre of mass. This results in a clockwise rotational force being exerted onto the pivotal arm (24). As the cutting head (10) rotates, a centrifugal force is also exerted onto the length of cutting line which extends from the cutting head (10). This results in the line trying to unwind from the spool resulting in the spool rotating relative to the cap. The only thing which stops the spool rotating relative to the cap is the peg (72) on the pivotal arm (24) which engages with the trough (64) formed on the base of the spool. The centrifugal force applied to the line is dependent on the length of the line.

In normal operation, the pivotal arm (24) is located in a position whereby the end of the pivotal arm (24) with the peg (72) is held inwardly due to the peg (72) engaging with one of the notches formed in the trough (64), which are visible in FIG. 18. The notch in the trough (64) is held in engagement with the peg (72) due to rotational force exerted on the spool (26) generated by centrifugal force applied to the cutting lines (16,18) due to the cutting head (10) rotating. In order for the peg (72) to disengage from a notch, the peg (72) has to force the spool (26) to rotate slightly against the biasing force applied to the spool (20) by the cutting lines (16,18). When normal lengths of line are extended from the cutting head (10) the biasing force on the spool is sufficient to overcome the biasing force on the pivotal arm (24) and thus hold the pivotal arm (24) stationary.

When one or both of the lines break, the rotational force applied to the spool (26) is reduced due to the reduction of the centrifugal force generated by the lines. Therefore, the biasing force on the pivotal arm (24) becomes greater than the retaining force and therefore the pivotal arm (24) is able to pivot due to the centrifugal force applied to the centre of mass of the arm (24). Once the peg has become disengaged from a notch, the spool (26) is able to rotate freely in relation to the cap (22). Therefore the spool (26) rotates relative to the cap (22) allowing more line (16,18) to feed out. As the spool (26) rotates, the peg (72) is guided along the trough (64) until it engages with the next notch. If sufficient line (16,18) has been fed out the retaining force will be sufficient to hold the peg (72) in an outward position in a notch. If not, the process is repeated until sufficient line (16,18) has been fed out.

The fact that the spool stores two lines instead of one has no effect on the operating method of the autofeed mechanism as described in EP 0 417 966 and EP 0 417 967.

Figure 19:
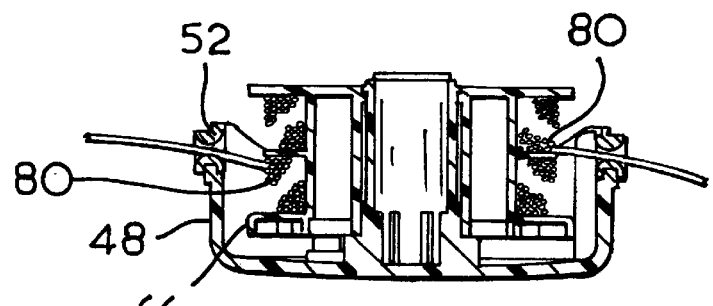
FIG. 19 shows a vertical cross-section of the cassette.

The spool cassette mechanism comprises the cap (22), the pivotal arm (24) pivotally mounted within the cap (22), the spool (26) rotatably mounted on the spindle (44) of the cap with the peg (72) of the pivotal arm (24) in engagement with the wavy trough (64) formed on the base (66) of the spool (26), a vertical cross section of which is shown in FIG. 19. The spool cassette mechanism can be clipped onto the base (20) of the cutting head (10) by deforming the two resilient clips (54) inwardly and pushing cassette into engagement with the base (20). The ribs (42) formed on the ends of the clips (54) engage in holes (40) formed within the base (20) of the cutting head (10) thus rigidly securing the cassette onto the base (20). When the cassette is mounted onto the base (20), the central core (34) of the base (20) locates within the spindle (44) of the cap (22), the ribs (42) of the clips (54) locating within the holes (40) in the base(20).

The operator then uses the string trimmer in the normal manner. When the line breaks the autofeed mechanism pays out more line in order to replenish the broken line (16,18). When the spool (24) is empty of line (80), an operator can detach the spool cassette mechanism by depressing the two resilient arms (54) inwardly at the finger grip portions (56) disengaging the ribs (42) from the corresponding holes (40) formed in the base of the cutting head thus removing the cap together with the spool and pivotal arm (24). The whole of the spool cassette mechanism is then discarded and a complete new spool cassette mechanism is clipped onto the base of the cutting head (10). The purpose of this design is to make the cutting head as a single disposable unit.

What is claimed is:

1. A string trimmer comprising an elongate shaft, a cutting head rotatably mounted on one end of the elongate shaft wherein the cutting head comprises:

a base;

a cap;

a spool rotatable mounted in the cap;

an autofeed mechanism mounted within the cap and which interacts between the cap and the spool;

the cap is releasably attachable to the base;

the autofeed mechanism includes a pivotal arm pivotally mounted in the cap and which engages with the spool;

the pivotal arm is pivotally mounted on the base of the cap and which engages with the underside of the spool; and wherein the pivotable arm includes a peg which engages with a wavy trough formed on the underside of the spool.

2. A string trimmer comprising an elongate shaft, a cutting head rotatably mounted on one end of the elongate shaft wherein the cutting head comprises:

a base;

a cap;

a spool rotatable mounted in the cap;

an autofeed mechanism mounted within the cap and which interacts between the cap and the spool; and a plurality of notches formed on the cap oppositely positioned on the cap from a position of the autofeed mechanism to counterbalance a weight of the autofeed mechanism;

wherein the cap is releasably attachable to the base.

3. A string trimmer as claimed in claim 2, wherein the cap clips into the base.

4. A string trimmer as claimed in claim 3, wherein the cap comprises a first part, and the base comprises a second part wherein two resilient arms having ribs formed on a distal end of the arms are mounted on the first part and which engage with corresponding holes formed in the second part.

5. A string trimmer as claimed in claim 2, wherein the autofeed mechanism comprises a pivotal arm pivotally mounted in the cap and which engages with the spool.

6. A string trimmer as claimed in claim 5, wherein the pivotal arm is pivotally mounted on the base of the cap and which engages with the underside of the spool.

7. A string trimmer as claimed in claim 2, wherein the cap comprises at least one aperture through which, in use, an end of one of a plurality of cutting lines extends from the spool.

8. A string trimmer as claimed in claim 7, wherein eyelets form the at least one aperture.

9. A string trimmer as claimed in claim 7, wherein there are two apertures through each of which can be extended one of the plurality of cutting lines.

10. A cutting head for a string trimmer comprising:

a base;

a cap;

a spool rotatable mounted in the cap;

an autofeed mechanism mounted within the cap and which interacts between the cap and the spool;

a plurality of notches formed on the cap oppositely positioned on the cap from a position of the autofeed mechanism to counterbalance a weight of the autofeed mechanism; and wherein the cap is releasably attachable to the base.

11. A cutting head as claimed in claim 10, wherein the cap clips into the base.

12. A cutting head as claimed in claim 11, wherein the cap comprises a first part and the base comprises a second part wherein two resilient deformable arms having ribs formed on an end of the arms are mounted on the first part and which engage with corresponding holes formed in the second part.

13. A cutting head as claimed in claim 10, wherein the autofeed mechanism comprises a pivotal arm pivotally mounted in the cap and which engages with the spool.

14. A cutting head as claimed in claim 13, wherein the pivotal arm is pivotally mounted on the base of the cap and which engages with the underside of the spool.

15. A cutting head as claimed in claim 14, wherein the pivotal arm comprises a peg which engages with a wavy trough formed on the underside of the spool.

16. A cutting head as claimed in claim 10, wherein the cap comprises at least one aperture through which, in use, an end of one of a plurality of cutting lines extends from the spool.

17. A cutting head as claimed in claim 16, wherein eyelets form the at least one aperture.

18. A cutting head as claimed in claim 16, wherein there are two apertures through each of which can extend one of the plurality of cutting lines.

19. A cassette mechanism capable of releasably attaching to a base of a cutting head on a string trimmer, the cassette mechanism comprising:

a cap;

a spool rotatable mounted in the cap;

an autofeed mechanism mounted within the cap and which interacts between the cap and the spool;

a plurality of notches formed on the cap oppositely positioned on the cap from a position of the autofeed mechanism to counterbalance a weight of the autofeed mechanism; and wherein the cap is capable of releasably attaching to a base of a cutting head of a string trimmer.

20. A cassette mechanism as claimed in claim 19, wherein the cap is capable of clipping into a base.

21. A cassette mechanism as claimed in claim 20, wherein the cap comprises two holes which are capable of receiving two ribs formed on the ends of two deformable arms mounted on a base of a cutting head of a string trimmer.

22. A cassette mechanism as claimed in claim 19, wherein the cap comprises two resilient deformable arms having ribs formed on a distal end of the arms and which are capable of engaging with corresponding holes formed in a base of a cutting head of a string trimmer.

23. A cassette mechanism as claimed in claim 19, wherein the autofeed mechanism comprises a pivotal arm pivotally mounted in the cap and which engages with the spool.

24. A cassette mechanism as claimed in claim 23, wherein the pivotal arm is pivotally mounted on the base of the cap and which engages with the underside of the spool.

25. A cassette mechanism as claimed in claim 24, wherein the pivotal arm comprises a peg which engages with a wavy trough formed on the underside of the spool.

26. A cassette mechanism as claimed in claim 19, wherein the cap comprises at least one aperture through which, in use, an end of one of a plurality of cutting lines extends from the spool.

27. A cassette mechanism as claimed in claim 26, wherein eyelets form the at least one aperture.

28. A cassette mechanism as claimed in claim 26, wherein there are two apertures through each of which can extend one of the plurality of cutting lines.

* * * * *